(12) United States Patent
Nabeshima

(10) Patent No.: US 9,841,886 B2
(45) Date of Patent: Dec. 12, 2017

(54) DISPLAY CONTROL APPARATUS AND CONTROL METHOD THEREOF

(71) Applicant: CANON KABUSHIKI KAISHA, Tokyo (JP)

(72) Inventor: Rui Nabeshima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 407 days.

(21) Appl. No.: 14/453,336

(22) Filed: Aug. 6, 2014

(65) Prior Publication Data
US 2015/0046869 A1    Feb. 12, 2015

(30) Foreign Application Priority Data

Aug. 8, 2013 (JP) ................................. 2013-165419

(51) Int. Cl.
G06F 3/048      (2013.01)
G06F 3/0485    (2013.01)
G06F 3/0482    (2013.01)
G06F 3/0488    (2013.01)

(52) U.S. Cl.
CPC .......... G06F 3/0485 (2013.01); G06F 3/0482 (2013.01); G06F 3/04883 (2013.01)

(58) Field of Classification Search
CPC ... G06F 3/0482; G06F 3/0485; G06F 3/04883
See application file for complete search history.

(56) References Cited

U.S. PATENT DOCUMENTS

| | | | | |
|---|---|---|---|---|
| 2005/0251760 | A1* | 11/2005 | Sato | G06F 3/023 715/856 |
| 2010/0058238 | A1* | 3/2010 | Ben Moshe | G06F 3/048 715/818 |
| 2011/0102421 | A1* | 5/2011 | Minamino | G06F 3/04815 345/419 |
| 2011/0167380 | A1* | 7/2011 | Stallings | G06F 3/0482 715/784 |
| 2011/0193881 | A1* | 8/2011 | Rydenhag | G06F 3/0414 345/647 |

(Continued)

FOREIGN PATENT DOCUMENTS

| | | |
|---|---|---|
| CN | 102053786 A | 5/2011 |
| CN | 102763067 A | 10/2012 |

(Continued)

*Primary Examiner* — William Bashore
*Assistant Examiner* — Gregory A Distefano
(74) *Attorney, Agent, or Firm* — Canon U.S.A., Inc. IP Division

(57) ABSTRACT

There is provided a display control apparatus capable of maintaining visibility regarding a display item during a drag operation. The display control apparatus includes a detection unit configured to detect a position input on a screen displayed on a display unit, a display control unit configured to display the display item on the display unit and to perform control to scroll of the display item with a display effect according to a scroll instruction, and a control unit configured to, if the detection unit detects the position input on the screen during the scroll, perform control to stop the scroll with the display effect displayed when the position input has been detected.

16 Claims, 5 Drawing Sheets

(56) References Cited

U.S. PATENT DOCUMENTS

| | | | | |
|---|---|---|---|---|
| 2011/0202869 A1* | 8/2011 | Sung | ................. | G06F 3/04892 715/784 |
| 2012/0162267 A1* | 6/2012 | Shimazu | ............. | G06F 3/04883 345/684 |
| 2012/0313946 A1* | 12/2012 | Nakamura | .......... | G06F 3/04815 345/426 |
| 2013/0176298 A1* | 7/2013 | Lee | ....................... | G06F 3/0488 345/419 |

FOREIGN PATENT DOCUMENTS

| | | | |
|---|---|---|---|
| JP | H05-100809 | A | 4/1993 |
| JP | 2006-018794 | A | 1/2006 |
| JP | 2007-043247 | A | 2/2007 |
| JP | 2012137822 | A | 7/2012 |
| JP | 2012-524318 | A | 10/2012 |
| JP | 2013077239 | A | 4/2013 |
| KR | 10-2010-0129892 | A | 12/2010 |
| KR | 20130081838 | A | 7/2013 |

* cited by examiner

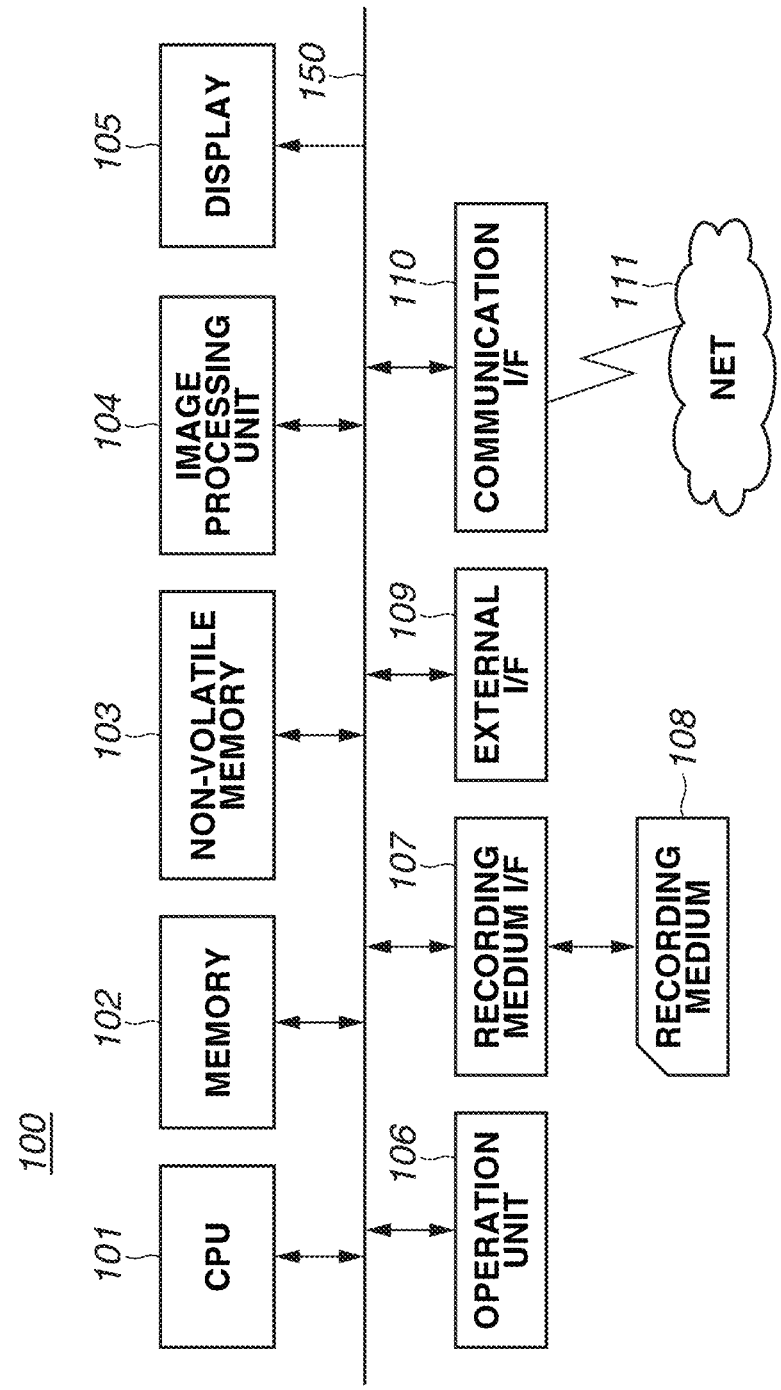

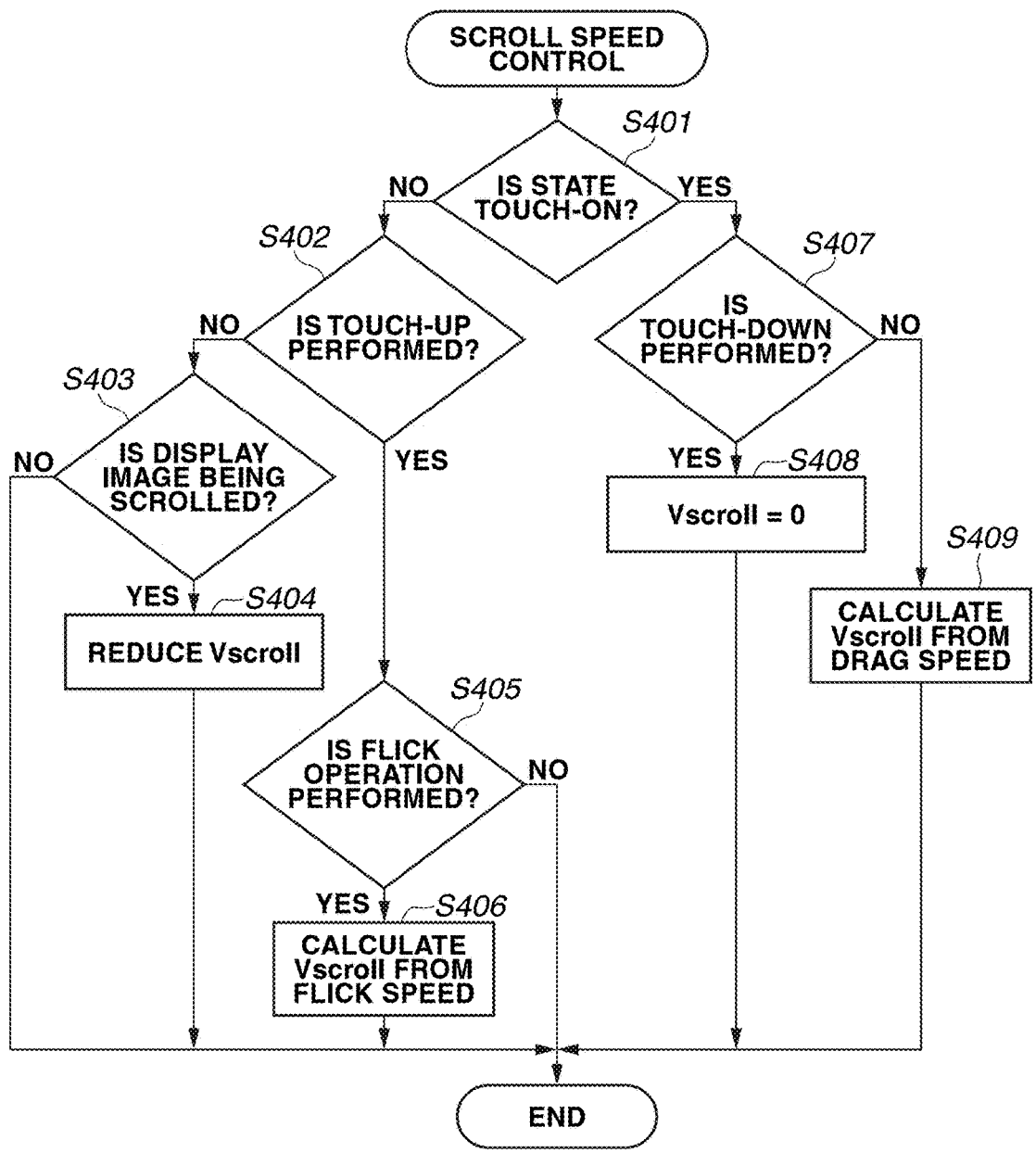

DISPLAY CONTROL APPARATUS AND CONTROL METHOD THEREOF

BACKGROUND OF THE INVENTION

Field of the Invention

The present disclosure generally relates to a display control apparatus and a control method for the display control apparatus. More particularly, the present disclosure relates to a technique useful for a user interface of a touch panel.

Description of the Related Art

In recent years, digital equipment having a display unit with a touch panel that allows intuitive operation is introduced to the market. Generally, the user of such digital equipment uses the equipment by placing a finger on an object on the touch panel.

For example, according to a method discussed in Japanese Patent Application Laid-Open No. 5-100809, the user scrolls the screen by touching an object displayed on the touch panel with a finger. The screen is scrolled as the user moves the position of the finger. Further, if the user quickly flicks the finger in one direction, inertial scroll can be started in that direction.

On the other hand, Japanese Patent Application Laid-Open No. 2007-43247 discusses a method used when a plurality of images, displayed at the same time, is scrolled. According to this method, horizontal lines are arranged and displayed in different density in the scroll direction. This display effect helps the user understand the scroll direction.

Further, there is also a method that adds depth to the display items. According to this method, a display item, such as an image, is slanted when it is displayed. Thus, when the user scrolls the screen, more depth is added in the scroll direction.

However, when the user desires to perform a drag operation to find a display item, if the degree of slant of the display items is changed, the user may not be able to easily find the display item. This is because the visibility regarding the display items may be reduced if the degree of slant of the display items is changed.

Thus, the display item may be slanted only under limited conditions such as not during the drag operation. However, if the user continuously flicks the touch panel, the display item may be slanted and back again to the original position at short intervals. In such a case, the visibility is also reduced.

SUMMARY OF THE INVENTION

The present disclosure is directed to a display control apparatus capable of maintaining visibility of a display item during a drag operation.

A display control apparatus includes a detection unit configured to detect a position input on a screen displayed on a display unit, a display control unit configured to display a display item on the display unit and enable scroll of the display item with a display effect corresponding to a scroll instruction, and a control unit configured to, if the detection unit detects the position input on the screen during the scroll, enable stop of the scroll with the display effect displayed when the position input has been detected.

Further features of the present disclosure will become apparent from the following description of exemplary embodiments with reference to the attached drawings.

BRIEF DESCRIPTION OF THE DRAWINGS

FIG. 1 is a block diagram illustrating a configuration example of a display control apparatus according to an exemplary embodiment of the present disclosure.

FIG. 4 is a flowchart illustrating scroll speed control processing according to an exemplary embodiment of the present disclosure.

DESCRIPTION OF THE EMBODIMENTS

Figure 2A:
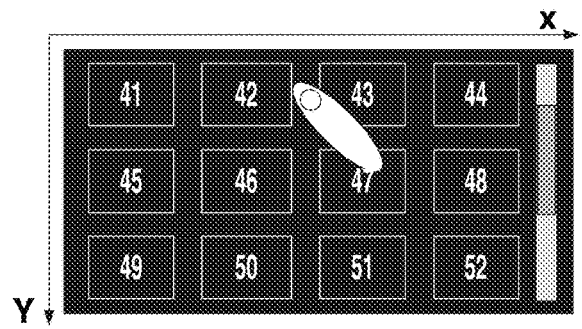
FIGS. 2A to 2F illustrate a screen of a touch panel which is displayed when the user scrolls the screen down according to an exemplary embodiment of the present disclosure.

Various exemplary embodiments, features, and aspects of the disclosure will be described in detail below with reference to the drawings.

The present exemplary embodiment described below is an example of embodiments that realize the present disclosure. The exemplary embodiment may be modified or changed as appropriate according to the configuration of the apparatus and various conditions. Thus, the present disclosure is not limited to the present exemplary embodiment described below.

FIG. 1 illustrates an example configuration of a display control apparatus 100 to which the present invention is applicable. The display control apparatus 100 may be configured using, for example, a personal computer (PC).

In FIG. 1, a central processing unit (CPU) 101, a memory 102, a non-volatile memory 103, an image processing unit 104, a display 105, an operation unit 106, a recording medium I/F 107, an external I/F 109, and a communication I/F 110 are connected to an internal bus 150. Each of the units connected to the internal bus 150 can exchange data via the internal bus 150 to each other. As used herein, the term "unit" generally refers to any combination of software, firmware, hardware, or other component that is used to effectuate a purpose.

The memory 102 includes, for example, a random access memory (RAM), which is a volatile memory using a semiconductor device. The CPU 101 controls each unit of the display control apparatus 100 according to a program stored in the non-volatile memory 103, by using the memory 102 as a work memory. The non-volatile memory 103 stores various types of data. They are, for example, image data, audio data, and other various data, and various programs used for the operation of the CPU 101. The non-volatile memory 103 is, for example, a hard disk (HD) or a read-only memory (ROM).

The image processing unit 104 performs various types of image processing based on the control of the CPU 101. The data processed by the image processing unit 104 is, for example, image data stored in the non-volatile memory 103 or a recording medium 108, video signals acquired via the external I/F 109, and image data acquired via the communication I/F 110. The image processing performed by the image processing unit 104 includes, for example, analog-to-digital (A/D) conversion processing, digital-to-analog (D/A) conversion processing, image data encoding processing, compression processing, decoding processing, scaling (resize) processing, noise reduction processing, and color conversion processing.

The image processing unit 104 may be a circuit block dedicated for particular image processing. Further, depending on the type of the image processing, the CPU 101 can perform image processing according to a program and without using the image processing unit 104.

The display 105 displays images and a screen such as a Graphical User Interface (GUI) screen according to the control of the CPU 101. The CPU 101 generates a display control signal according to a program and also generates a video signal. Further, the CPU 101 controls each unit of the display control apparatus 100 so that the video signal is output to and displayed on the display 105.

The display 105 displays video based on the output video signal. Although the display control apparatus 100 needs to include the interface for the display 105, it does not necessary include the display 105. In other words, the display 105 may be an external monitor such as a television.

The operation unit 106 is an input device that accepts user operation. The operation unit 106 includes a textual information input device such as a keyboard, a pointing device such as a mouse or a touch panel, a button, a dial, a joy stick, a touch sensor, and a touch pad. The touch panel is an input device which functions as a touch detector. The touch panel is an input device formed by a planar panel provided over the display 105 and is capable of outputting coordinate information corresponding to the touched position. Thus, the touch panel serves as a touch detection unit. If the touch panel is included in the operation unit 106, the CPU 101 can detect the operations performed with respect to the touch panel or the state of the touch panel described below.

The action of the user newly touching the touch panel with a finger or a stylus. In other words, the action corresponding to the start of the touch. This action is hereinafter referred to as "Touch-Down".

The state of the user touching the touch panel with the finger or the stylus. This state is hereinafter referred to as "Touch-On".

The action of the user moving the finger or the stylus on the touch panel while it is in contact with the panel. This action is hereinafter referred to as "Touch-Move".

The action of the user removing the finger or the stylus which is in contact with the touch panel from the touch panel. This action is hereinafter referred to as "Touch-Up".

The state of the user not touching the touch panel. This state is hereinafter referred to as "Touch-Off".

If the CPU 101 detects the action Touch-Down, the CPU 101 simultaneously detects the state Touch-On. In other words, after the action Touch-Down, the state Touch-On is continuously detected so long as the CPU 101 does not detect the action Touch-Up. Further, the CPU 101 detects the action Touch-Move while the state Touch-On is detected. Even if the state is Touch-On, the CPU 101 does not detect the action Touch-Move if the user does not change the touch position. When the CPU 101 determines that all the fingers or the stylus is removed from the touch panel (Touch-Up), the CPU 101 detects the state Touch-Off.

These operations, states, and the position coordinates of the finger or the stylus on the touch panel are notified to the CPU 101 via the internal bus 150. Upon receiving the information, the CPU 101 determines the operation which has been performed with respect to the touch panel. As for the action Touch-Move, the moving direction of the finger or the stylus on the touch panel can be determined for each vertical/horizontal component of the touch panel based on the change in the position coordinates.

Further, if the CPU 101 detects the action Touch-Down, a certain amount of the action Touch-Move, and the action Touch-Up, the CPU 101 determines a stroke with respect to the touch panel. A quick stroke operation is called a "flick". The flick is determined when the user quickly moves the finger for a certain distance on the touch panel and then removes the finger from the touch panel. In other words, it is an operation corresponding to the user quickly running the finger on the touch panel as though flicking the touch panel. If the action Touch-Move of a predetermined distance or more and at a predetermined speed or higher is detected, and, further, if the action Touch-Up is detected in that state, the CPU 101 determines that the flick operation has been performed.

Further, if the CPU 101 detects the action Touch-Move of a predetermined distance or more at a speed lower than a predetermined speed, the CPU 101 determines that a drag operation has been performed. The touch panel is formed according to any of the methods employing a resistive film method, a capacitive touch screen method, a surface elastic wave method, an infrared method, an electromagnetic induction method, an image recognition method, and a light sensor method.

The recording medium I/F 107 can be attached to the recording medium 108 such as a memory card, a compact disc (CD), and a digital versatile disc (DVD). Based on the control of the CPU 101, the recording medium I/F 107 can read out data from the attached recording medium 108 and write data in the recording medium 108. The external I/F 109 is an interface connected to an external device via a wired cable or a wireless means of communication. The external I/F 109 is used for inputting/outputting a video signal or an audio signal. The communication I/F 110 is an interface used for the transmission/reception of various types of data such as a file or a command according to the communication with an external device or the Internet 111.

<Operation>

The operation of the present exemplary embodiment will now be described with reference to FIGS. 2A to 2F and FIGS. 3A, 3B, and 3C.

According to the present exemplary embodiment, a case where the user scrolls the screen of the display 105 by operating the touch panel will be described. The screen displays a plurality of images by index display.

According to the index display of the present exemplary embodiment, a plurality of images (e.g., a plurality of thumbnail images) are arranged and displayed in a matrix.

In the index display in FIGS. 2A to 2F, the images are arranged in a predetermined order, for example, corresponding to the image file name, the image number, or the shooting date and time. The images are arranged in the order, for example, from the left end to the right end of a certain row, and from the left end to the right end of the next row. If the number of the images exceeds a maximum number of images which can be displayed on the screen, the user can scroll the screen up or down to display the images on the previous or the subsequent row.

Each of the screens in FIGS. 2A to 2F is displayed when the user scrolls down the screen by touching the screen.

FIG. 2A illustrates a screen displayed when the user performs the action Touch-Down in a state where the screen is not scrolled and the images are not slanted.

Figure 2D:
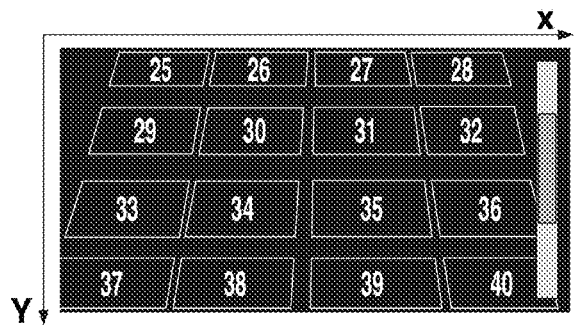
Figure 2B:
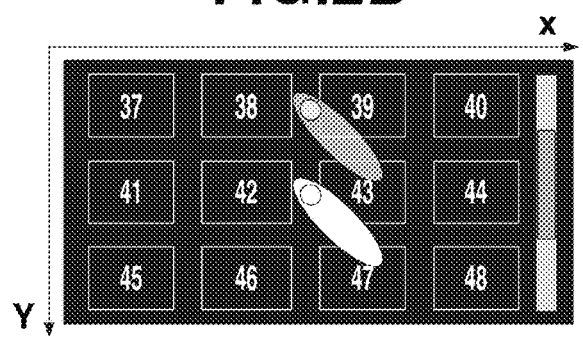

FIG. 2B illustrates a screen displayed when the user performs the action Touch-Move in the downward direction in the state illustrated in FIG. 2A. In FIG. 2B, all the images have moved down (positive in the Y-axis direction).

Figure 2E:
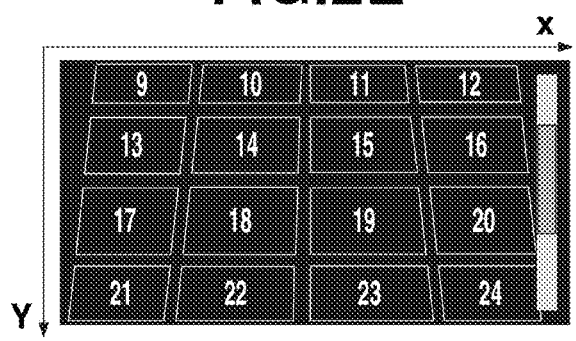
Figure 2C:
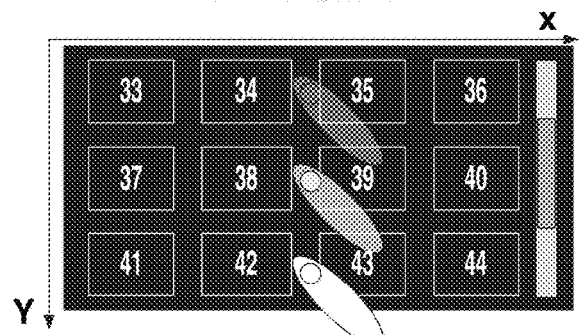

FIG. 2C illustrates a screen displayed when the user further performs the action Touch-Move in the downward direction in the state illustrated in FIG. 2B. The screen shows the state just before the flick operation.

FIG. 2D illustrates a screen where all the images on the screen are slanted and scrolled down according to the flick operation of the user in the state illustrated in FIG. 2C. The images are slanted in such a manner that the near side corresponds to the direction of movement of the scroll with reference to the X-axis. More precisely, in FIG. 2D, since the screen is scrolled from top to bottom, each image is slanted in such a manner that the portion at the lower side of the screen which corresponds to the scroll direction (i.e., the downstream side in the scroll direction) is slanted toward the near side and the portion at the upper side of the screen (i.e., the upstream side in the scroll direction) is slanted toward the far side. The angle of slant in this case is positive.

On the other hand, if the screen is scrolled from bottom to top, each image is slanted in such a manner that the portion at the upper side of the screen which corresponds to the scroll direction (i.e., the downstream side in the scroll direction) is slanted toward the near side and the portion at the lower side of the screen (i.e., the upstream side in the scroll direction) is slanted toward the far side. The angle of slant in this case is negative.

Further, the images may be slanted only when the scroll speed is equal to or higher than a predetermined speed. In this manner, an allowance area where the images are not slanted can be arranged. In other words, if the amount of scroll is small, the images are not slanted and the reduction in visibility can be prevented.

FIG. 2E illustrates a screen displayed when the scroll speed is reduced from the state illustrated in FIG. 2D. In FIG. 2E, the angle of slant is also small. As can be seen from FIGS. 2D and 2E, the faster the scroll speed, the greater the angle of slant.

Figure 2F:
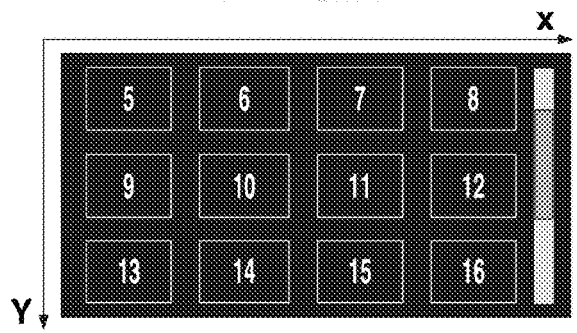

FIG. 2F illustrates a screen displayed when the scroll speed is furthermore reduced from the state illustrated in FIG. 2E and the scroll is stopped. In FIG. 2F, the angle of slant of the images is 0 degrees.

Figure 3A:
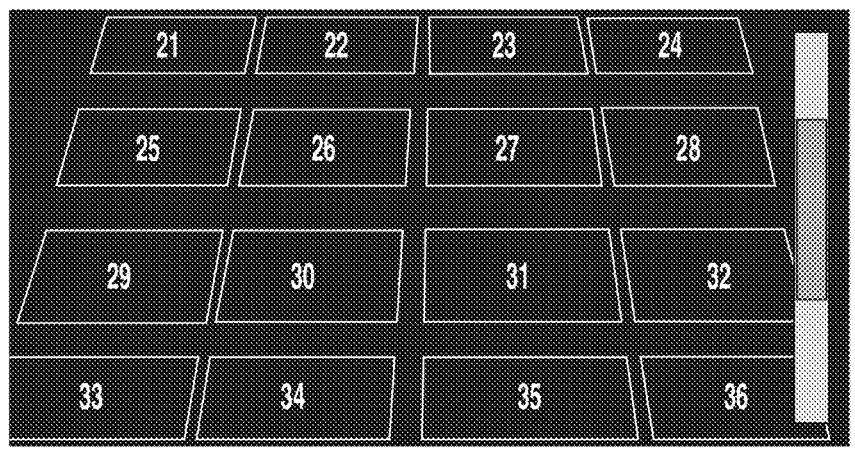
FIGS. 3A to 3C illustrate a screen of the touch panel which is displayed when the user continuously scrolls down by a touch operation when the touch panel is scrolled in the downward direction according to an exemplary embodiment of the present disclosure.
Figure 3B:
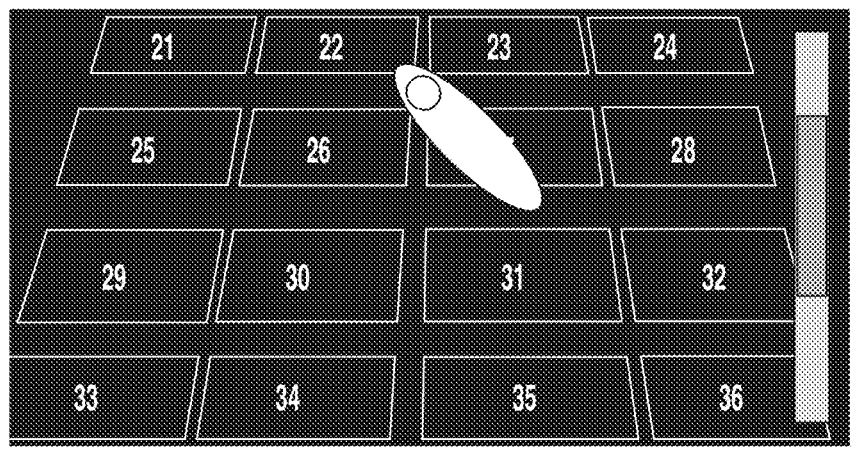
Figure 3C:
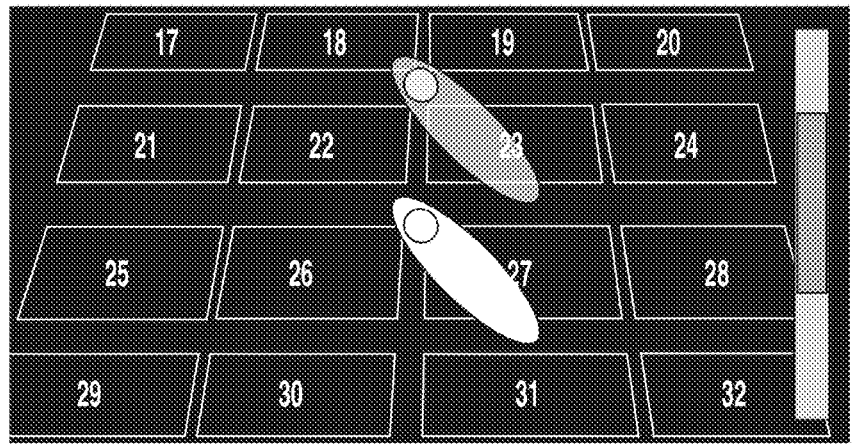

Each of the screens in FIGS. 3A to 3C is displayed when the user continuously scrolls down the screen by touching the screen while the screen is scrolled down.

In FIG. 3A, each of the images is slanted in such a manner that the bottom side corresponds to the near side and the screen is scrolled down.

FIG. 3B illustrates a screen displayed when the user performs the action Touch-Down in the state illustrated in FIG. 3A. Once the action Touch-Down is performed, the angle of slant is maintained so long as the user keeps the state Touch-On.

FIG. 3C illustrates a screen displayed when the user performs the action Touch-Move in the downward direction in the state illustrated in FIG. 3B. In this case also, the angle of slant is unchanged from the state illustrated in FIG. 3A.

Since the angle of slant is maintained and the display is not significantly changed from the state Touch-Off even if the user performs the action Touch-Down and further performs the action Touch-Move, the visibility regarding the display items can be maintained.

<Processing Procedures>

Figure 5:
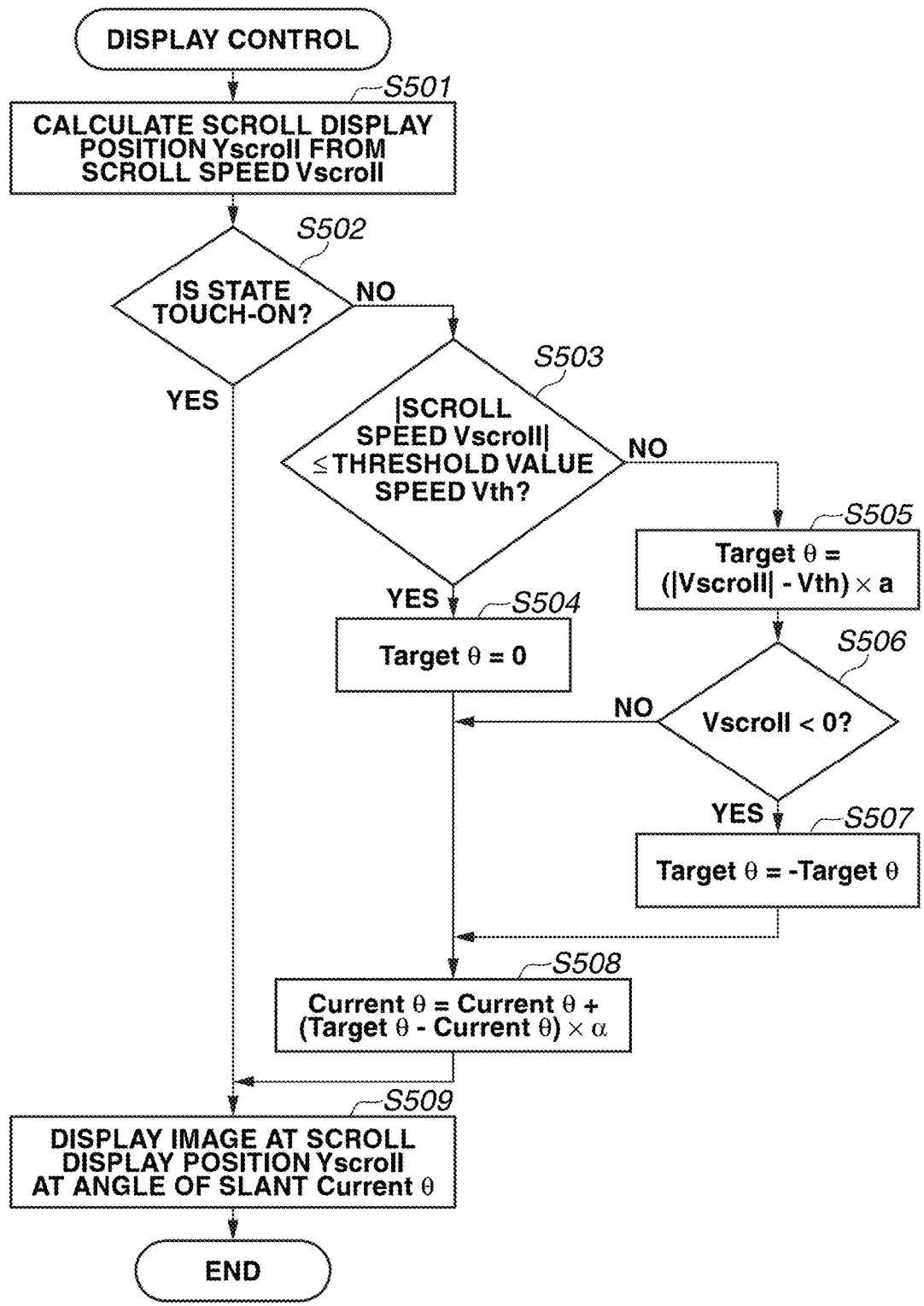
FIG. 5 is a flowchart illustrating display control processing according to an exemplary embodiment of the present disclosure.

Next, the processing procedures of the above-described operation will be described in detail with reference to flowcharts in FIGS. 4 and 5. The flowcharts in FIGS. 4 and 5 are realized by the CPU 101 loading a program recorded in the non-volatile memory 103 into a work memory area of the memory 102, executing the loaded program, and controlling each unit of the display control apparatus 100 according to the program.

<Scroll Speed Control Processing>

The scroll speed control processing according to a touch input with respect to the index display will be described with reference to the flowchart in FIG. 4. This processing is executed when a plurality of images read out from the recording medium 108 is displayed on the display 105 by index display (e.g., FIG. 2F). It is processing for determining the scroll speed when the displayed images are scrolled. This processing is repeatedly performed at regular intervals while the images are displayed by the index display. Further, it is performed in parallel with the processing in FIG. 5 described below.

In step 401, the CPU 101 determines whether the screen is in the state Touch-On.

If the screen is in the state Touch-On (YES in step S401), the processing proceeds to step S407. If the screen is not in the state Touch-On (NO in step S401), the processing proceeds to step S402.

In step S402, the CPU 101 determines whether the action Touch-Up is performed. If the action Touch-Up is performed (YES in step S402), the processing proceeds to step S405. If the action Touch-Up is not yet performed (NO in step S402), the processing proceeds to step S403.

In step S403, the CPU 101 determines whether the display image is being scrolled. If the display image is not being scrolled (NO in step S403), then the processing in FIG. 4 ends. If the display image is being scrolled (YES in step S403), the processing proceeds to step S404.

In step S404, the CPU 101 reduces the scroll speed Vscroll, stores the reduced speed in the memory 102, and then the processing in FIG. 4 ends. If the scroll speed Vscroll is lower than a predetermined speed before reducing speed in step S404, the CPU 101 reduces the scroll speed Vscroll to zero in step S404, and stops the scroll.

In step S405, the CPU 101 determines whether the flick operation is performed. If the flick operation is performed (YES in step S405), the processing proceeds to step S406. If the flick operation is not performed (NO in step S405), then the processing in FIG. 4 ends.

In step S406, the CPU 101 calculates the scroll speed Vscroll from the flick speed, stores the calculated speed in the memory 102, and then the processing in FIG. 4 ends.

The scroll speed Vscroll increases according to the increase in the flick speed. The flick speed is the speed of the action Touch-Move just before the action Touch-Up according to the flick operation. The inertial scroll is started according to the scroll speed Vscroll which has been calculated from the flick speed. If the touch panel is still in the state Touch-Off when the state is checked next (NO in step S401), the processing proceeds to step S402. In step S402, it is determined that the Touch-Up is not performed (NO in step S402), and the processing proceeds to step S403. In step S403, it is determined that the display image is being scrolled (YES in step S403), and the processing proceeds to step S404. Then, in step S404, since the scroll speed Vscroll is reduced, the inertial scroll is performed after the touch operation.

In step S407, the CPU 101 determines whether the action Touch-Down is performed. If it is determined that the action Touch-Down is performed (YES in step S407), the processing proceeds to step S408. If it is determined that the action Touch-Down is not performed (NO in step S407), the processing proceeds to step S409.

In step S408, the CPU 101 sets the scroll speed Vscroll to 0, stores it in the memory 102, and then the processing in FIG. 4 ends.

In step S409, the CPU 101 calculates the scroll speed Vscroll from the drag speed, stores it in the memory 102, and then the processing in FIG. 4 ends. The drag speed (the speed of the action Touch-Move) increases according to the increase in the scroll speed Vscroll.

<Display Control Processing>

The display control processing according to a touch input with respect to the index display will now be described with reference to a flowchart in FIG. 5. This processing is executed when a plurality of images read out from the recording medium 108 is displayed on the display 105 by index display (e.g., FIG. 2F). This processing is repeatedly performed at regular intervals while the images are displayed by the index display. If the display position and the angle of slant of each image are changed for each predetermined cycle, the images appear to be an animation. If the display position and the angle of slant are unchanged, the images appear to be in an unmoving state.

In step S501, the CPU 101 calculates a scroll display position Yscroll based on the scroll speed Vscroll, which has been determined by the above-described processing in FIG. 4, stores the obtained Yscroll in the memory 102, and the processing proceeds to S502.

In step S502, the CPU 101 determines whether the touch panel is in the state Touch-On. If it is determined that the touch panel is in the state Touch-On (YES in step S502), the processing proceeds to step S509. If it is determined that the touch panel is not in the state Touch-On (NO in step S502), the processing proceeds to step S503.

In step S503, the CPU 101 determines whether the absolute value of the scroll speed Vscroll is equal to or lower than a threshold speed Vth.

If it is determined that the absolute value of the scroll speed Vscroll is equal to or lower than the threshold speed Vth (YES in step S503), the processing proceeds to step S504. If it is determined that the absolute value of the scroll speed Vscroll is greater than the threshold speed Vth (NO in step S503), the processing proceeds to step S505.

In step S504, the CPU 101 sets a parameter Target $\theta$ used for the calculation of the angle of slant to 0 and stores it in the memory 102. Then, the processing proceeds to S508.

In step S505, the CPU 101 calculates the parameter Target $\theta$ according to the equation below, stores the obtained Target $\theta$ in the memory 102, and the processing proceeds to step S506. As can be seen from the equation below, the faster the scroll speed, the greater the parameter Target $\theta$ used for the calculation of the angle of slant.

$$\text{Target } \theta = (|V\text{scroll}| - V\text{th}) \times a,$$

where "a" is a given constant.

In step S506, the CPU 101 determines whether the scroll speed Vscroll is lower than 0. This processing corresponds to determination processing of the scroll direction. If the scroll speed Vscroll is lower than 0 (in other words, the scroll direction is from bottom to top) (YES in step S506), the processing proceeds to step S507. If the scroll speed Vscroll is equal to or higher than 0 (in other words, the scroll is stopped (Vscroll=0) or the scroll direction is from top to bottom) (NO in step S506), the processing proceeds to step S508.

In step S507, the CPU 101 inverses the sign of Target $\theta$ ("Target $\theta$=−Target $\theta$") and stores the obtained result in the memory 102. Then, the processing proceeds to S508. In this manner, the image will be slanted in the direction that corresponds to the scroll direction. Thus, the user can determine the direction of the scroll from the slant of the image.

In step S508, the CPU 101 calculates an angle of slant Current $\theta$ according to the equation below, stores the obtained result in the memory 102, and the processing proceeds to step S509.

$$\text{Current } \theta = \text{Current } \theta + (\text{Target } \theta - \text{Current } \theta) \times \alpha,$$

where $\alpha$ is a given constant.

In step S509, the CPU 101 displays the image at the scroll display position Yscroll with the angle of slant Current $\theta$. Then the processing in FIG. 5 ends.

The operations described with reference to FIGS. 2 and 3 described above are realized by the processing in FIGS. 4 and 5.

According to the processing in FIGS. 4 and 5, if the CPU 101 determines that the touch panel is in the state Touch-On in step S502, the processing proceeds to step S509 and the CPU 101 does not update the angle of slant Current $\theta$. Thus, so long as the touch panel is in the state Touch-On, the angle of slant of the image is fixed.

For example, after the flick operation, if the inertial scroll is performed in the state Touch-Off (e.g., the state in the above-described FIGS. 2D and 2E), the scroll can be stopped (step S408) by the user performing the action Touch-Down. When the scroll is stopped according to the action Touch-Down, the angle of slant just before Touch-Down is maintained (steps S502 to S509).

In other words, if the inertial scroll is performed when the images are displayed at the angle of the images illustrated in FIG. 2D just before Touch-Down, the display angle in FIG. 2D is maintained when the scroll is stopped.

Further, if the inertial scroll is performed when the images are displayed at the angle of the images in FIG. 2E just before the action Touch-Down, the display angle in FIG. 2E is maintained when the scroll is stopped. In other words, the image is not returned to the display state before the scroll is started (unslanted state).

Then, if the user performs the action Touch-Move without performing the action Touch-Up (in other words, if the user performs the drag operation), the screen is scrolled according to the direction and the speed of the action Touch-Move (step S409) and the display angle is maintained during the scroll (steps S502 to S509).

When the user performs the action Touch-Up, the display effect of the images return to the effect that corresponds to the degree of the scroll speed and the direction (NO in step S502). In other words, when the user performs the drag operation, the reduction in visibility due to the change in the display angle of the images can be prevented and the visibility of the images during the drag operation can be enhanced.

According to the above-described exemplary embodiment, a case where the screen is scrolled when a plurality of images are displayed by index display (multi-display) is described. However, the items displayed on the screen are not necessarily such images. For example, different items are applicable to the present exemplary embodiment so long as they are items (display items) displayed on the screen. For example, the present exemplary embodiment may be applied to a case where icons that represent application software are displayed and scrolled. In this case, the display angle of the icons can be changed and displayed according to the scroll direction and the scroll speed. Similarly, the present exemplary embodiment can be applied to a case where various icons that indicate document files and music files as well as items that indicate certain setting values are displayed and scrolled.

Further, according to the above-described exemplary embodiment, a display angle (more precisely, a perspective angle) of an image (display item) is taken as an example of the display effect that expresses the scroll direction and the speed. Further, if the user performs the action Touch-Down when the screen is scrolled, the display effect is unchanged when the scroll is stopped. However, the display effect according to the above-described exemplary embodiment is not limited to such an example. For example, a different display effect can also be applied so long as it indicates the scroll direction. In such a case, if the user performs the action Touch-Down during the scroll, the display effect that indicates the scroll direction will be unchanged when the scroll is stopped.

For example, in a case where the scroll direction is expressed by the display interval of the display items as discussed in Japanese Patent Application Laid-Open No. 2007-43247, if the user performs the action Touch-Down when the scroll is being performed, the display interval of the display items as a display effect is unchanged when the scroll is stopped. Subsequently, so long as the state is Touch-On, even if the user performs the drag operation (Touch-Move), the display items (e.g., images) can be scrolled according to the drag operation with the display interval of the display items unchanged.

As another example of expressing the scroll direction, the size of the display item is changed at each display position according to the scroll direction. For example, a display item on the upstream side in the scroll direction can be displayed by the size greater than a display item on the downstream side in the scroll direction.

In this case, if the screen is scrolled from bottom to top, the display size of the display item displayed on the upper side of the screen during the scroll will be set to a larger size than the display item displayed on the bottom side of the screen.

On the other hand, if the scroll direction is from top to bottom, the display size of the display item displayed on the bottom side of the screen during the scroll will be set to a larger size than the display item displayed on the upper side of the screen.

Further, the size of the display item can be changed according to the scroll speed. For example, the faster the scroll speed, the greater the size difference between the display item on the upstream side and the display item on the downstream side. If the present exemplary embodiment is applied to this display effect, the control will be as described below.

Specifically, in a case where the scroll direction is expressed by the difference in the display size of the display items, if the user performs the action Touch-Down when the scroll is being performed, the display size of the display items is unchanged when the scroll is stopped.

Subsequently, so long as the state is Touch-On, even if the user performs the drag operation (Touch-Move), the display items (e.g., images) can be scrolled according to the drag operation with the display size of the display items at each position on the screen unchanged.

In this case, since the display size is determined according to the position of the display item on the screen, the size of the display item which is scrolled by the drag operation is changed according to the display position. However, whether the display item is enlarged (or reduced) toward the top side (or the bottom side) of the screen is fixed.

As another example of the display effect that indicates the scroll direction, there is a background color of the display items. For example, the background color of the portion of the screen on the most upstream side in the scroll direction may be set to white and the background color of the portion of the screen on the most downstream side in the scroll direction may be set to black. Further, the portion between the white and the black portions can be expressed by gradations in color between white to black from the most upstream side toward the most downstream side.

Further, the area of the white portion on the upstream side in the scroll direction can be changed from the area of the black portion on the downstream side in the scroll direction according to the scroll speed. If the present exemplary embodiment is applied to this display effect, the control will be as described below.

Specifically, in a case where the scroll direction is expressed by the background color of the display items, if the user performs the action Touch-Down when the scroll is being performed, the background color of the display items is unchanged when the scroll is stopped.

Subsequently, so long as the state is Touch-On, even if the user performs the drag operation (Touch-Move), the display items (e.g., images) can be scrolled according to the drag operation with the background color of the display items unchanged.

The display effects described above can also be combined and applied.

Further, according to the above-described exemplary embodiment, although a touch panel is used as the display control apparatus, a device capable of position input on the screen (i.e., a pointing device) can be applied to the present exemplary embodiment in place of the touch panel. For example, a mouse can be used in place of the touch panel. If a mouse is used in place of the touch panel, clicking the mouse (i.e., holding down the left button to input a position on the screen), moving the mouse while maintaining the click state, and releasing the click (i.e., releasing the left button) are performed in place of the above-described Touch-Down, Touch-Move, and Touch-Up, respectively.

According to the above-described exemplary embodiment, although the scroll is stopped during the scroll when a position input on the screen is performed. However, the scroll is not necessarily stopped. For example, the scroll may be performed with the display effect unchanged. In this case, the display effect is the effect just before the position input.

Further, according to the present exemplary embodiment, the scroll is stopped according to the position input on the screen and the display effect is maintained even if a drag operation is performed after the scroll is stopped. However, the display effect is not limited to such an example.

For example, when the scroll is stopped according to a position input on the screen, although the display effect is maintained while the scroll is stopped, the display effect may be updated when a drag operation is performed. In other words, when the drag operation is performed, the display effect may be changed according to the scroll direction and/or the scroll speed that corresponds to the drag operation.

According to each of the exemplary embodiments described above, although the present disclosure is applied to a personal computer, the present disclosure is not limited to such an example. In other words, the present disclosure can also be applied to an imaging apparatus, such as a digital camera, including an image sensor. In other words, the present disclosure is also applicable to a case where a user desires to reproduce and display a captured image, which can be read by a digital camera, on a display such as an LCD of the digital camera on the back side. In this case, the captured image is recorded in a recording medium, such as a memory card, which can be read by the digital camera.

Furthermore, the present disclosure is also applicable to an apparatus, which can display images, such as a personal digital assistant (PDA), a cellular phone terminal, a portable image viewer, a printer apparatus with a display, a digital photo frame, a music player, a game machine, or an electronic book reader.

Further, the above-described exemplary embodiments can also be achieved by supplying a software program (computer-executable program) that realizes each function of aforementioned exemplary embodiments to a system or an apparatus via a network or various types of computer-readable storage media, and a computer (or a CPU or a MPU) in the system or the apparatus reads and executes the program stored in such storage media.

According to the present disclosure, the visibility of the display items can be favorably maintained during the drag operation.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-165419 filed Aug. 8, 2013, which is hereby incorporated by reference herein in its entirety.

What is claimed is:

1. A display control apparatus comprising a memory and at least one processor which function as:
   a detection unit configured to detect a position input on a screen displayed on a display unit;
   a display control unit configured to display a display item on the display unit and to scroll the display item with a display effect corresponding to a scroll instruction; and
   a control unit configured
   to scroll, in a state where the position input is not detected, the display item with a display effect which is different depending on whether a direction of the scroll is a first direction or a second direction opposite to the first direction, in response to a scroll instruction,
   to stop the scroll and to maintain, if the detection unit detects the position input on the screen during the scroll, the display effect displayed when the position input has been detected during a detection of the position input, and
   to scroll, in a state where the position input is being detected with the display effect displayed when the position input has been detected, the display item while maintaining the display effect displayed when the position input has been detected, according to movement of a position of the position input.

2. The display control apparatus according to claim 1, wherein if the position input has come to be undetected in a state where the position input is detected with the display effect displayed when the position input has been detected and, further, in a state where the position input is not moved, the control unit performs control to cancel the display effect.

3. The display control apparatus according to claim 1, wherein if the position input has come to be undetected in a state where the position input is detected with the display effect displayed when the position input has been detected and, further, in a state where the position input is moved, the control unit performs control to scroll the display item with the display effect corresponding to the scroll instruction when the position input has not been detected.

4. The display control apparatus according to claim 1, wherein the detection unit is a touch detection unit configured to detect a touch input on the display unit.

5. The display control apparatus according to claim 1, wherein the display control unit scrolls the display item at a scroll speed according to the scroll instruction and with a degree of the display effect according to the scroll speed.

6. The display control apparatus according to claim 1, further comprising an accepting unit configured to accept a user operation as the scroll instruction.

7. The display control apparatus according to claim 1, wherein the display effect is an effect of slanting the display item in a different direction corresponding to a scroll direction.

8. The display control apparatus according to claim 1, wherein the display effect is an effect of slanting the display item at different angles according to a scroll speed.

9. The display control apparatus according to claim 1, wherein the display effect is an effect of changing a display size of the display item at each position on the screen according to a scroll direction.

10. The display control apparatus according to claim 1, wherein the display effect is an effect of changing a display size of the display item at each position on the screen according to a scroll speed.

11. The display control apparatus according to claim 1, wherein the display effect is an effect of changing a background color at each position on the screen according to a scroll direction.

12. The display control apparatus according to claim 1, wherein the display effect is an effect of changing a background color at each position on the screen according to a scroll speed.

13. The display control apparatus according to claim 1, wherein, according to the scroll instruction accepted in a state where a plurality of display items is displayed by multi-display on the display unit, the display control unit performs control to scroll the plurality of display items.

14. The display control apparatus according to claim 1, wherein the display control unit is an imaging apparatus including an imaging unit.

15. A control method of a display control apparatus comprising:
- detecting a position input on a screen displayed on a display unit;
- performing control to display a display item on the display unit and to scroll the display item with a display effect according to a scroll instruction; and
- performing control
    - to scroll, in a state where the position input is not detected, the display item with a display effect which is different depending on whether a direction of the scroll is a first direction or a second direction opposite to the first direction, in response to a scroll instruction,
    - to stop the scroll and to maintain, if the position input is detected on the screen during the scroll, the display effect displayed when the position input has been detected during a detection of the position input, and
    - to scroll, in a state where the position input is being detected with the display effect displayed when the position input has been detected, the display item while maintaining the display effect displayed when the position input has been detected, according to movement of a position of the position input.

16. A non-transitory computer-readable storage medium storing a program for causing a computer to execute a control method of a display control apparatus, the method comprising:
- detecting a position input on a screen displayed on a display unit;
- performing control to display a display item on the display unit and to scroll the display item with a display effect according to a scroll instruction; and
- performing control
    - to scroll, in a state where the position input is not detected, the display item with a display effect which is different depending on whether a direction of the scroll is a first direction or a second direction opposite to the first direction, in response to a scroll instruction,
    - to stop the scroll and to maintain, if the position input is detected on the screen during the scroll, the display effect displayed when the position input has been detected during a detection of the position input, and
    - to scroll, in a state where the position input is being detected with the display effect displayed when the position input has been detected, the display item while maintaining the display effect displayed when the position input has been detected, according to movement of a position of the position input.

* * * * *